United States Patent [19]
Lüthi

[11] 3,934,483
[45] Jan. 27, 1976

[54] FEED APPARATUS

[75] Inventor: Walter Lüthi, Ebnat, Switzerland

[73] Assignee: Werkzeugmaschinenfabrik Oberlikon-Buhrle AG, Zurich, Switzerland

[22] Filed: Feb. 11, 1974

[21] Appl. No.: 441,653

[30] Foreign Application Priority Data
Feb. 23, 1973  Switzerland.......................... 2646/73

[52] U.S. Cl............... 74/424.8 R; 74/441; 74/59.15
[51] Int. Cl.².......................................... F16H 1/18
[58] Field of Search................. 74/424.8, 441, 59.15

[56] References Cited
UNITED STATES PATENTS

| | | | |
|---|---|---|---|
| 2,482,082 | 9/1949 | Wahlberg........................... | 74/424.8 |
| 3,439,550 | 4/1969 | Goulding ........................... | 74/424.8 |
| 3,454,136 | 7/1969 | Stark................................. | 74/424.8 |
| 3,577,796 | 5/1971 | Eissfeldt............................ | 74/424.8 |

Primary Examiner—Samuel Scott
Assistant Examiner—Wesley S. Ratliff, Jr.
Attorney, Agent, or Firm—Werner W. Kleeman

[57] ABSTRACT

A feed apparatus for displacing a movable part or component relative to a stationary part of component by means of a threaded spindle mounted at one part and a nut member arranged at the other part. Between the nut member and the part associated with the nut member there are provided two rings concentric to the spindle axis, each of said rings being supported to be radially displaceable upon a surface perpendicular to the spindle axis and extending into a substantially ring-shaped groove and hydraulically held in axial direction. Between the grooves and the ring members there is present sufficient play for inclinedly positioning the ring members in the grooves and the aforementioned surfaces are directed in opposite directions from one another.

9 Claims, 6 Drawing Figures

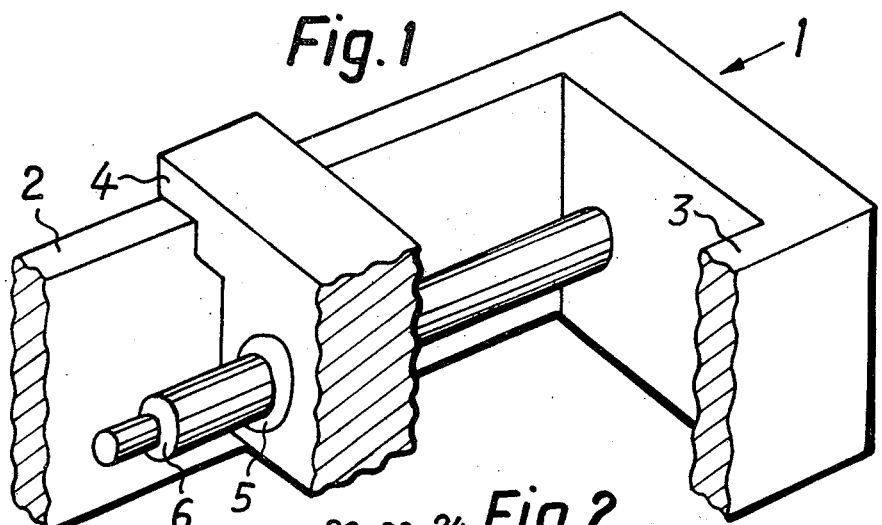
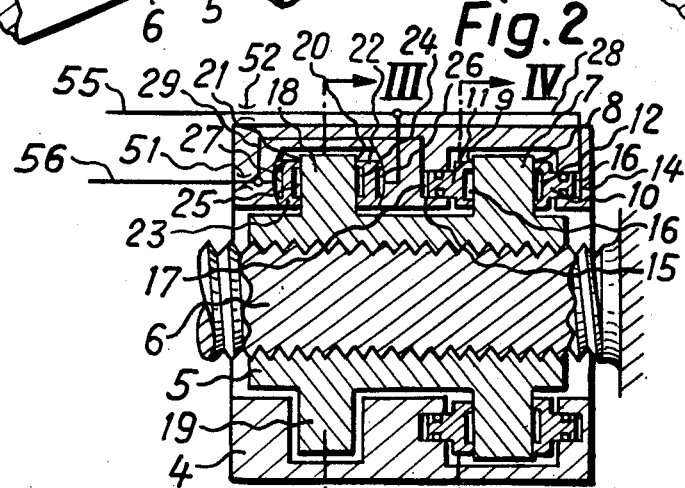

FEED APPARATUS

BACKGROUND OF THE INVENTION

The present invention relates to a new and improved construction of feed apparatus for displacing a movable part or component relative to a stationary part or component with a threaded spindle mounted in one part or component and a nut member arranged at the other part or component.

With a known feed mechanism of this general type a threaded spindle is mounted at a machine tool bed and a nut member is rigidly secured to a carriage.

The rigid attachment of the nut member at the carriage is associated with the drawback that when the carriage is positioned at an inclination with respect to the spindle axis the spindle is deformed, since between the spindle and the carriage, apart from there being effective the axial force required for the feed movement, there is also effective undesired transverse forces. Consequently, the attained precision of the carriage movement is markedly impaired.

SUMMARY OF THE INVENTION

Hence, it is a primary object of the present invention to provide an improved construction of feed apparatus which is not associated with the aforementioned drawbacks and limitations of the prior art proposals.

Another and more specific object of the present invention aims at the provision of an improved construction of feed apparatus which avoids the occurrence of the previously mentioned undesired transverse forces which act from the spindle upon the carriage, wherein there is overcome the rigid connection of the nut member and nonetheless there is guaranteed for high rigidity of the feed apparatus in the direction of movement.

Now in order to implement these and still further objects of the invention, which will become more readily apparent as the description proceeds, the invention contemplates that between the nut member and the part or component associated with the nut member there are provided two ring members arranged substantially concentrically with respect to the spindle axis, of which ring members each is supported so as to be radially displaceable on the one hand at a surface perpendicular to the spindle axis and on the other hand extends into a substantially ring-shaped groove and is hydraulically retained in axial direction. Between the grooves and the ring members there is available sufficient play for the inclined positioning of the ring members in the grooves and the aforementioned surfaces are directed opposite to one another.

Also the rotational moment transmitted from the threaded spindle to the nut member, with the carriage located at an inclination, can exert a transverse force at the carriage with respect to the spindle axis. Also this transverse force generated by the rotational moment can be avoided in that preferably the nut member is provided with two diametrically oppositely situated projections having two respective surfaces parallel to one another and to the spindle axis for taking-up the rotational moment exerted by the threaded spindle upon the nut member and that the surfaces of one such projection bear against substantially spherical segments or semi-spherical members which are mounted at the part or component associated with the nut member and that the surfaces of the other projection bear through the agency of substantially spherical segments or semi-spherical members at two oppositely situated pistons which are arranged substantially perpendicular to the surfaces and which pistons are guided at the part or component associated with the nut member.

BRIEF DESCRIPTION OF THE DRAWING

The invention will be better understood and objects other than those set forth above, will become apparent when consideration is given to the following detailed description thereof. Such description makes reference to the annexed drawing wherein:

FIG. 1 is a perspective view illustrating an arrangement of a threaded spindle mounted at a machine tool bed and a carriage equipped with a nut member and guided at such machine tool bed;

FIG. 2 is a cross-sectional view through the carriage with the nut member at the threaded spindle taken along the spindle axis;

FIG. 3 is a cross-sectional view of the arrangement depicted in FIG. 2, taken substantially along the line III—III thereof;

FIG. 4 is a cross-sectional view of the arrangement depicted in FIG. 2, taken substantially along the line IV—IV thereof;

DETAILED DESCRIPTION OF THE PREFERRED EMBODIMENTS

Figure 5:
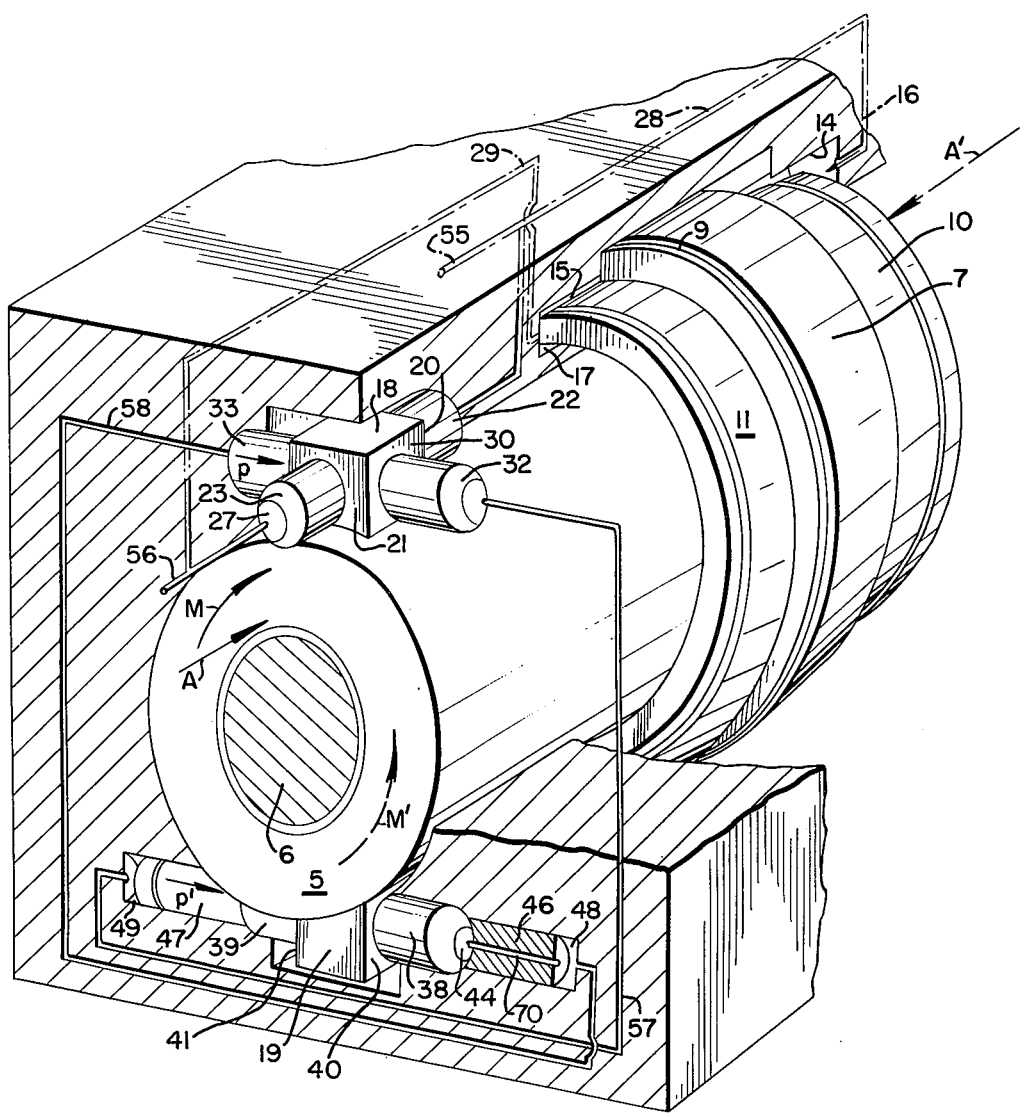
FIG. 5 is a perspective cross-sectional view showing details of the arrangement of FIG. 2.

Describing now the drawing, according to the showing of FIG. 1 a machine tool bed 1 is equipped with two guide tracks or guide ways 2 and 3. A carriage 4 is supported upon such guide tracks 2 and 3. A threaded spindle 6 is rotatably mounted at both of its ends at the machine tool bed 1. As a matter of convenience in illustration there is only depicted the one rotatable support or mounting of one end of the threaded spindle. The carriage 4 possesses a nut member 5 which is threaded upon the threaded spindle 6.

According to the showing of FIG. 2 the nut member 5 has a substantially ring-shaped or annular flange 7 equipped with two end surfaces 8 and 9, upon which there is axially supported a respective ring member 10 and 11 with six segment-like oil pockets 12 and 13 respectively. The ring members 10 and 11 extend into substantially ring-shaped grooves 14 and 15 respectively of the carriage 4. The ring members 10 and 11 which are equipped with seals delimit compartments 16 and 17 respectively in the grooves 14 and 15 respectively and which compartments are filled with oil or the like. Furthermore, the nut member 5 is provided with two diametrically oppositely situated projections or extensions 18 and 19. On the one hand at each surface 20 and 21 of the projection 18 which is perpendicular to the spindle axis and at the carriage 4 on the other hand, there bears a substantially spherical segment 22 and 23 respectively. The spherical segments 22 and 23 each respectively possess two oil pockets 24, 26 and 25, 27. The oil pocket 26 of the spherical segment 22 is connected via a line or conduit 28 with the compartment or chamber 16, belonging to the ring member or ring 10 and which is supported in the same direction at the nut member 5 as the spherical segment 22. The oil pocket 27 of the spherical segment 23 is connected via a conduit or line 29 with the compartment or chamber 17, which belongs to the ring or ring member 11 and which is supported in the same direction at the nut member 5 as the spherical segment 23.

A suitable source of pressurized oil, which has not been particularly shown in the drawing to simplify the illustration, is connected via the pressurized oil supply lines or conduits 55, 56 and via throttles 51, 52 with the oil pockets 24, 25, 26, 27 of the spherical segments 22, 23 and via the lines or conduits 28, 29 with the oil pockets 12, 13 and the compartments or chambers 16, 17 of the ring members 10, 11.

According to the showing of FIGS. 3 and 5, on the one hand there bears at each surface 30 and 31 of the projection 18 and which surfaces are parallel to the spindle axis, and on the other hand at the carriage 4, a respective substantially spherical segment 32 and 33. The spherical segments 32 and 33 each possess two respective oil pockets 34, 36 and 35, 37. On the one hand, at each surface 40 and 41 of the projection 19, and which surfaces are parallel to the spindle axis, and on the other hand upon a respective piston 46 and 47 there bears a substantially spherical segment 38, 39. Each piston 46 and 47 is located in a cylindrical compartment or chamber 48 and 49 respectively of the carriage 4.

The oil pocket 36 of the spherical segment 32 is connected via a line or conduit 57 with the substantially cylindrical compartment or chamber 49 in which there is located the piston 47, which operates in the opposite rotational direction as the spherical segment 32.

The oil pocket 37 of the spherical segment 33 is connected via a line or conduit 58 with the substantially cylindrical compartment or chamber 48 in which there is located the piston 46, and which functions in the opposite direction of rotation as the spherical segment 33.

A source of pressurized oil, which has not been particularly shown in the drawing, is connected via the conduits or lines 59, 60 and via throttles 53, 54 with the oil pockets 34, 35, 36, 37 of the spherical segments 32, 33 and via the lines or conduits 57, 58 with the cylindrical compartments or chambers 48, 49.

The pistons 46, 47 each possess a bore, such as bore 70 shown in FIG. 5 for the piston 46, which flow communicates the cylindrical compartments 48 and 49 with the oil pockets 44 and 45 of the spherical segments 38 and 39 respectively. For all of the spherical segments of the entire apparatus both of their oil pockets are connected with one another via a respective not particularly visible bore. Also the ring members 10 and 11 possess a not particularly illustrated bore which connects the oil pockets 12 and 13 with the compartments or chambers 16 and 17 respectively.

Figure 6:
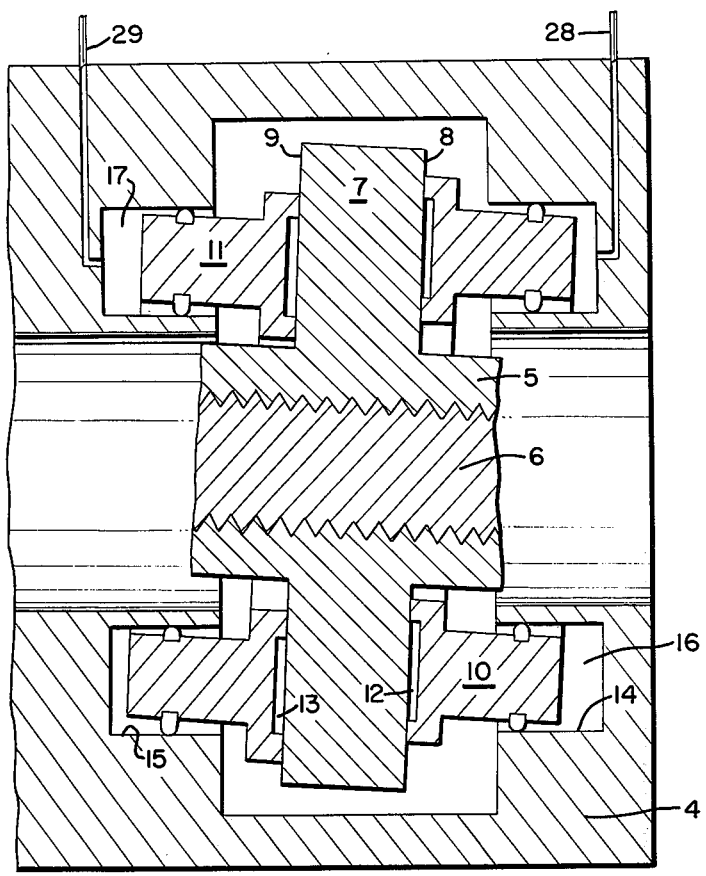
FIG. 6 is a fragmentary sectional view showing in an exaggerated manner the mode of operation of the ring members when the threaded spindle is positioned at an inclination relative to the carriage.

Having had the benefit of the discussion of the construction of the feed apparatus of this development its mode of operation will be now considered and is as follows:

If the carriage 4 is positioned at an inclination with respect to its threaded spindle 6, then the ring members 10 and 11 which are visible from the showing of FIG. 2 also accordingly position themselves at an inclination at the annular or ring-shaped grooves 14, 15 of the carriage 4 as shown for instance in FIG. 6. Consequently, the transmission of forces from the threaded surface of the threaded spindle 6 to the threaded surface of the nut member 5 continues to occur uniformly.

An axial force, for instance in the direction of the arrow A of FIG. 5, occurring during feed or advance of the carriage 4 brings about corresponding changes in the gap heights and pressure conditions at the oil pockets 24, 25, 26, 27 of the spherical segments 22, 23 which bear at the projection 18. If, for instance, the axial force acts in a direction wherein the oil pressure is increased in the oil pocket 26 located between the spherical segment 22 and the carriage 4, then this increased pressure is transmitted from the oil pocket 26 via the line or conduit 28 into the compartment or chamber 16 between the ring member 10 and the carriage 4. Consequently, there is exerted upon the ring member 10 a counter force corresponding to the axial force. In the case of an axial force which acts in the other direction the oil pressure increases in the oil pocket 27 which is located between the spherical segment 23 and the carriage 4 and this pressure is transmitted via the line or conduit 29 into the compartment or chamber 17 between the ring member 11 and the carriage 4. There is then exerted upon the ring member 11 a counter force corresponding to the axial force. Consequently, the axial rigidity of the feed apparatus is insured.

A rotational moment M (FIG. 5) transmitted from the threaded spindle 6 to the nut member 5 during feed of the carriage 4 brings about corresponding changes of the gap heights and pressure conditions at the oil pockets 34, 35, 36, 37 of the spherical segments 32, 33 which bear at the projection 18. If, for instance, a rotational moment M occurs in the direction of rotation which increases the oil pressure in the oil pocket 36 which is located between the spherical segment 32 and the carriage 4, in other words according to the showing of FIG. 3 a rotational moment in the clockwise direction, then this increased pressure is transmitted via the conduit or line 57 to the compartment 49 at the piston 47, and which acts in the opposite direction of rotation as the rotational moment exerted upon the nut member 5, in other words in FIG. 3 in the counter clockwise direction and as indicated in FIG. 5 by reference character M'. When there occurs a rotational moment M there is produced by the piston 47 a counter rotational moment M' of the same magnitude, so that no transverse forces act upon the spindle shaft or axis.

With opposite rotational direction of the rotational moment the oil pressure in the oil pocket 37 of the spherical segment 33 is increased and is transmitted via the conduit or line 58 to the compartment or chamber 48 at the piston 46. The piston 46 generates, for the exerted rotational moment, a counter rotational moment of the same magnitude, so that no transverse forces act upon the spindle shaft or axis.

While there is shown and described present preferred embodiments of the invention, it is to be distinctly understood that the invention is not limited thereto, but may be otherwise variously embodied and practiced within the scope of the following claims. Accordingly,

What is claimed is:

1. A feed apparatus for displacing a movable component with respect to a stationary component by means of a threaded spindle mounted at one component and a nut member arranged at the other component, the improvement comprising two ring members substantially concentrically arranged with respect to the axis of the spindle, the nut member being supported in the other component by means of said two ring members, two surfaces arranged perpendicular to the axis of the spindle, each of said ring members being radially displaceably supported at a respective one of the surfaces and extending into a respective substantially ring-shaped groove, means for hydraulically retaining said ring members in axial direction, and wherein between the grooves and the ring members there is provided sufficient play for positioning each ring member at an inclination in the groove, and said surfaces are directed opposite to one another.

2. The apparatus as defined in claim 1, wherein said nut member possesses two diametrically oppositely situated projections each having two respective surfaces located substantially parallel to one another and to the lengthwise axis of the spindle for taking-up rotational moments exerted by the threaded spindle upon the nut member, said surfaces of one projection being supported against substantially spherical segments which are mounted at the other component associated with the nut member, and wherein said surfaces of the other projection bear via substantially spherical segments upon two oppositely situated pistons arranged substantially perpendicular to said last-mentioned surfaces and guided at the other component associated with the nut member.

3. The apparatus as defined in claim 2, especially for a machine tool for displacing a carriage along a guide track, wherein the nut member is arranged at the carriage, said carriage defining said other component.

4. The apparatus as defined in claim 1, wherein said surfaces are arranged at the nut member and said grooves are arranged at the other component associated with the nut member.

5. The apparatus as defined in claim 1, wherein the ring members are hydrostatically supported at said surfaces.

6. The apparatus as defined in claim 3, further including means for hydrostatically supporting the spherical segments associated with said one projection at said one projection and at the carriage.

7. The apparatus as defined in claim 3, further including means for hydrostatically supporting the spherical segments associated with said other projection at said other projection and at said pistons.

8. The apparatus as defined in claim 3, further including means for preventing axial displacement of the nut member with respect to the carriage, said axial displacement preventing means containing two substantially spherical segments which are hydrostatically supported axially at one of the projections and at the carriage, and hydraulically retaining means including means for hydraulically connecting the last-mentioned substantially spherical segments supported in one direction at the nut member with the ring members supported in the same direction at the nut member, oil pockets provided between the spherical segments and the carriage, said hydraulically connecting means including conduit means for connecting said oil pockets with compartments located between the ring members and the carriage.

9. The apparatus as defined in claim 3, wherein each piston which acts in one direction upon the other projection is arranged in a respective substantially cylindrical compartment of the carriage, each of said compartments being hydraulically connected via a conduit with an oil pocket of the associated respective spherical segment which acts upon said one projection in the opposite direction of rotation as the associated piston.

* * * * *